Nov. 4, 1969          L. E. WILLIAMS          3,476,021
BEARING ASSEMBLY WITH PRESTRESSING AND RETAINING MEANS
Filed Jan. 15, 1968

FREE STATE

PRESTRESSED

UNDER MAXIMUM
COMPRESSIVE LOAD

INVENTOR.
Lewis E. Williams
BY
Robert J. Outland
ATTORNEY

United States Patent Office 3,476,021
Patented Nov. 4, 1969

3,476,021
BEARING ASSEMBLY WITH PRESTRESSING AND RETAINING MEANS
Lewis E. Williams, Dearborn, Mich., assignor to General Motors Corporation, Detroit, Mich., a corporation of Delaware
Filed Jan. 15, 1968, Ser. No. 697,876
Int. Cl. F16j *1/14;* F16c *5/00*
U.S. Cl. 92—187          6 Claims

ABSTRACT OF THE DISCLOSURE

A piston-connecting rod assembly includes a piston pin and means for prestressing the pin by deforming it in its unloaded condition such that normal load stresses in the opposite direction of the initial prestress are reduced by the amount of prestress.

FIELD OF THE INVENTION

This invention relates to prestressed bearing means and more particularly to a piston-connecting rod assembly utilizing a piston pin and means for prestressing the pin to reduce the maximum stresses caused in the pin by engine operation.

DESCRIPTION OF THE PRIOR ART

It is known in the art relating to piston-connecting rod bearing assemblies to utilize a piston pin member as a means of pivotally connecting the piston to the connecting rod and transmitting forces therebetween. It is further known to provide what is known as a trunnion mounting wherein the piston pin is secured to the end of the connecting rod as by bolting and the upper surface of the pin is journaled in a bearing retained in the piston. This arrangement provides a maximum surface for absorbing the compressive forces which, in two-stroke cycle engines, make up substantially all the forces transmitted between the piston and connecting rod.

In order to reduce the weight of the reciprocating parts of an engine, the piston pin is usually formed as a hollow cylinder having a wall thickness as small as is consonant with its required load carrying capacity. The required wall thickness depends primarily on the maximum stresses reached in the piston pin material due to the compressive forces.

SUMMARY OF THE INVENTION

The present invention provides means for increasing the load carrying capacity of a piston pin which is subjected to primarily compressive forces by providing means for prestressing the pin so as to obtain initial stresses opposite in direction to those caused by the compressive forces acting on the pin. In this manner, the maximum stress in the pin material caused by the compressive forces of normal engine operation are reduced by the amount of initial prestress provided. This reduction in maximum stress permits the use of a thinner, lighter pin in a particular application or the application of heavier loads to a particular pin construction than would otherwise be possible.

These and other advantages of the invention will be more apparent from the following description and drawings disclosing a preferred means for carrying out the invention.

DESCRIPTION OF THE PREFERRED EMBODIMENT

Figure 1:
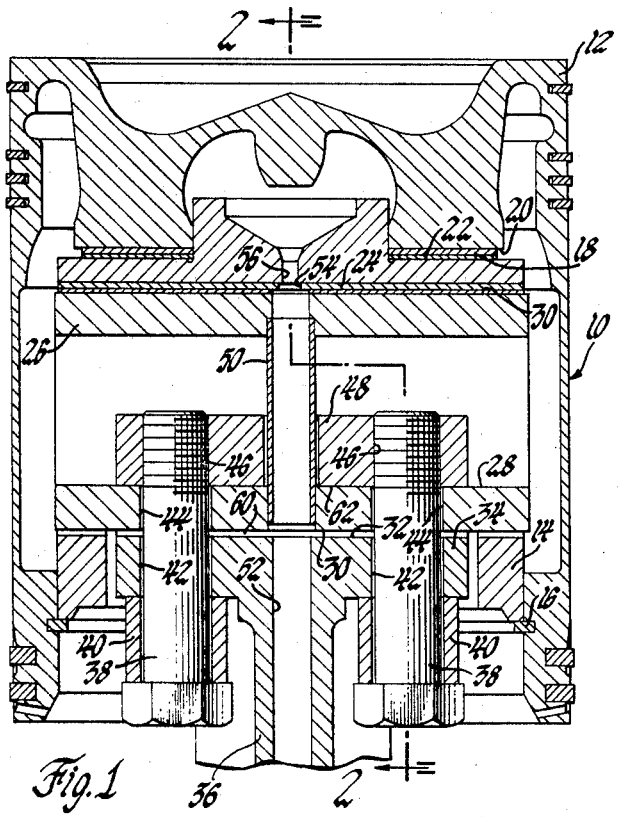
FIGURE 1 is a cross-sectional view of a piston-connecting rod assembly having piston pin retaining and prestressing means according to the invention and showing the piston pin in it unstressed state.

Referring to the drawings, there is shown a piston-connecting rod assembly generally indicated by numeral 10. Assembly 10 includes a floating piston assembly made up of a piston 12 and carrier 14. Piston 12 is retained in the carrier by means of a snap ring 16 and transmits combustion forces to the carrier in an axially downward direction, as shown in the drawings, through a thrust washer 18 located between opposed annular surfaces 20 and 22 of the piston and carrier, respectively. Retained within carrier 14 is a semi-cylindrical bearing members 24 in which is received a hollow cylindrical piston pin 26 having inner and outer surfaces 28 and 30, respectively. In the free state of the pin, surfaces 28 and 30 have circular cross-sections concentrically disposed about a common axis.

On its side opposite to bearing 24, piston pin 26 is received in an arcuate saddle 32 formed in the T shaped end 34 of a connecting rod 36. The pin is fixed to the rod by a pair of bolts 38 extending through spacers 40 and through openings 42, 44 in the connecting rod saddle and pin, respectively, into engagement with threaded opening means 46 of a retainer member or nut 48 disposed in the interior of the pin 26. The pin also includes a tubular insert 50 which connects drilled passages 52, 54 and 56 of the connecting rod, bearing and carrier, respectively, for the distribution of oil for cooling the piston and lubricating the piston pin bearing.

Figure 3:
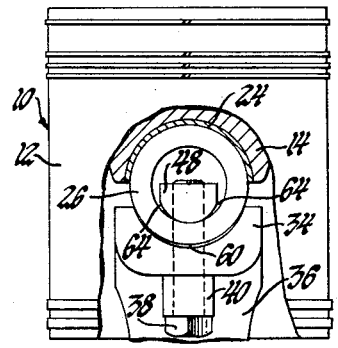
FIGURE 3 is an elevational view of the piston of FIGURES 1 and 2, partially in section, to show the configuration of the piston pin in its unstressed state.
Figure 2:
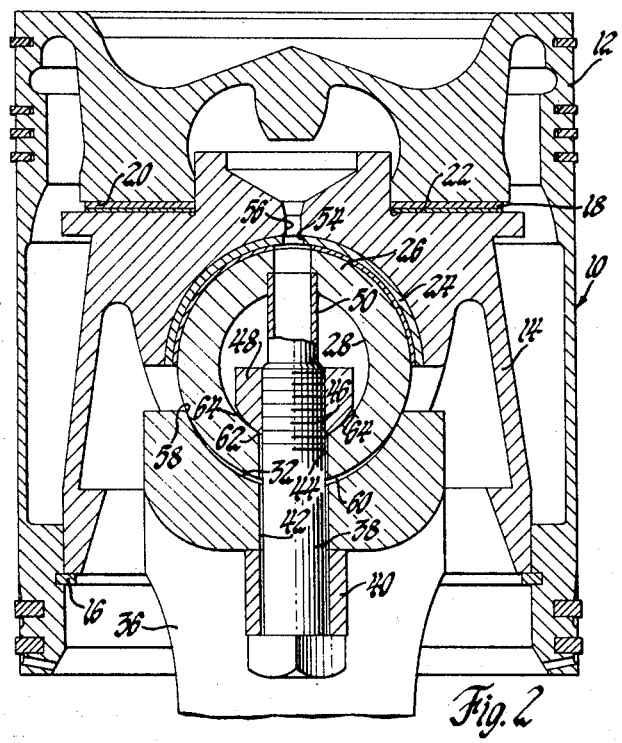
FIGURE 2 is a cross-sectional view of the assembly of FIGURE 1 taken generally in the planes indicated by the line 2—2 of FIGURE 1.

As shown in FIGURES 1 and 2, the parts are in the assembled state but the bolts have not been completely tightened, thus, the parts are in their unstressed conditions. In this state, it may be seen that the radius of outer pin surface 30 is slightly greater than the radius of saddle 32 so that, while these surfaces are in contact at the outer edges 58 of the saddle, a clearance 60 exists at points intermediate the edges. In the same manner, the lower surface 62 of nut 48 has a radius which is slightly smaller than the radius of the inner pin surface 28 so that, in the untightened state, the nut contacts the pin in a line along its center with clearances 64 existing between the edges of the nut and surface 28. The above described condition is also shown in FIGURE 3, identified as the free state.

Figure 4:
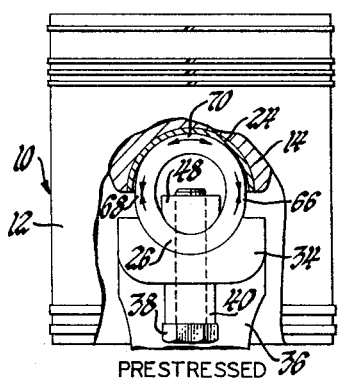
FIGURE 4 is a view similar to FIGURE 3 but showing the configuration of the piston pin with the retaining and prestressing means tightened and indicating by arrows stresses existing near the outer surface of the piston pin.

In completion of the assembly, bolts 38 are, of course, completely tightened so as to draw nut 48 downwardly and deform slightly the walls of pin 26, closing clearance 60 between the pin and saddle and clearances 64 between the nut and pin and bending the lower side of the pin into a smaller arc conforming substantially to the radius of the saddle 32. In this condition, which is shown in FIGURE 4, the pin assumes a somewhat oval shape with its diameter in the direction longitudinally of the connecting rod being slightly increased while its diameter transversely of the connecting rod is slightly diminished.

This deformation of the pin results in its prestressing, causing compression forces in the outer surface of the pin material in the transverse locations indicated by the arrows at points 66 and 68, respectively, and tensile forces in the material of the upper pin surface as indicated by the arrows at point 70. The amount of prestress, of course, depends upon the amount of deformation which must be predetermined to stay within the yield strength of the pin material at all points.

Figure 5:
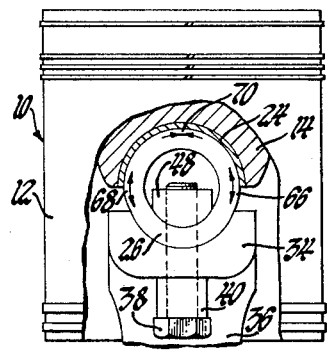
FIGURE 5, is a view similar to FIGURE 4 but showing the piston pin configuration and stresses existing therein when the pin is under a maximum compressive load due to combustion pressure in the engine.

When the piston-connecting rod assembly is installed in an engine, substantial combustion loads are transmitted between the piston and the connecting rod through the pin with the amount of load varying in cyclic fashion. As previously mentioned, the maximum load carrying capacity of the pin is determined primarily by the stresses created in the pin under the maximum compressive load condition. This condition is illustrated in FIGURE 5 wherein the gas forces acting downwardly on the piston 12 have deformed the piston pin causing its transverse dimension to increase and its longitudinal dimension, along the axis of the connecting rod, to diminish. This reverses the direction of stress in the piston pin material from that of the initial preload, resulting, as indicated by the arrows, in tensile stresses at points 66 and 68 and compression stresses at point 70. These stresses are reduced from the maximums which would occur in the same pin contruction under non-preloaded initial conditions by substantially the amount of prestress which was initially present in the pin in its unloaded condition as shown in FIGURE 4.

By providing means to deform and, therefore, initially prestress the piston pin, the present invention provides a structure capable of absorbing greater maximum stresses with a piston pin of given wall thickness.

I claim:
1. A prestressed bearing assembly comprising a first member having a saddle portion,
 a hollow generally cylindircal pin received in the saddle portion of said first member,
 a second member having an arcuate surface in bearing engagement with said pin at points generally opposite the saddle portion of said first member,
 said pin being fixed with respect to said first member and arranged for relative oscillation with respect to said second member and said pin being adapted to transmit compressive forces between said members and
 means resiliently deforming said pin to extend its cross-sectional dimensions in a first plane generally along the line of transmission of said compressive forces and to reduce its cross-sectional dimensions in a second plane perpendicular to said first plane whereby to cause initial stresses in the pin in its unloaded state, said initial stresses being opposed in direction to the stresses caused in the pin by transmission of said compressive forces such that the maximum stresses of the pin due to the compressive forces are reduced by substantially the amount of said initial stresses.
2. The bearing assembly of claim 1 wherein
 said pin has in its free state a circular cross-section having a given outer radius,
 said first member saddle portion is arcuately formed having a radius smaller, by a predetermined amount, than the free outer radius of said pin and
 said deforming means includes means securing said pin with its outer surface in contact with said saddle portion intermediate its ends so as to prestress said pin in its unloaded state.
3. A piston-connecting rod assembly comprising
 a connecting rod having a saddle at one end, a hollow generally cylindrical pin fixedly received in said connecting rod saddle,
 A piston member having a bearing surface in engagement with said pin generally opposite said connecting rod saddle, said pin being oscillatably movable in said bearing surface and adapted to transmit compressive forces between said piston and said connecting rod generally along the line of an axial plane of said pin and
 means securing said pin in said connecting rod saddle and cooperating therewith to resiliently deform said pin so as to increase its width in the direction of said axial plane and to decrease its width in a perpendicular direction, whereby to prestress the pin in its unloaded state so as to offset, at least in part, stresses caused by the transmission of said compressive forces.
4. The assembly of claim 3 wherein
 said pin has in its free state, a circular cross-section having a given outer radius,
 said connecting rod saddle is arcuately formed having a radius smaller by a predetermined amount than the free outer radius of said pin and
 said securing means maintains the outer surface of said pin in contact with said saddle adjacent its ends and at intermediate points so as to prestress said pin in its unloaded state.
5. The assembly of claim 4 wherein said pin has in its free state a given radius and said securing means comprise
 an extended retainer disposed within said hollow pin and having an arcuate surface engaging the pin interior opposite said saddle, said retainer arcuate surface having a radius smaller than the free inner radius of said pin and
 means to force said retainer toward said saddle to prestress said pin.
6. The assembly of claim 5 wherein said retainer forcing means comprise bolts extending through openings in said connecting rod saddle and said pin and engaging threaded opening means in said retainer.

References Cited

UNITED STATES PATENTS

| | | | |
|---|---|---|---|
| 1,803,362 | 5/1931 | Steele | 287—20 X |
| 1,822,322 | 9/1931 | Steele | 287—20 X |
| 3,053,595 | 9/1962 | Dilworth | 287—20 |
| 3,157,417 | 11/1964 | Ruskin | 92—187 X |

CARROLL B. DORITY, Primary Examiner

U.S. Cl. X.R.

287—20; 308—23